(12) United States Patent
Hill

(10) Patent No.: US 7,449,996 B2
(45) Date of Patent: Nov. 11, 2008

(54) CARGO CLEARANCE WARNING SYSTEM

(76) Inventor: James M. Hill, 2660 Spring Blvd., Eugene, OR (US) 97403

( * ) Notice: Subject to any disclaimer, the term of this patent is extended or adjusted under 35 U.S.C. 154(b) by 273 days.

(21) Appl. No.: 11/332,410

(22) Filed: Jan. 13, 2006

(65) Prior Publication Data

US 2007/0164854 A1 Jul. 19, 2007

(51) Int. Cl.
*B60Q 1/00* (2006.01)
*G09F 21/04* (2006.01)

(52) U.S. Cl. .................... 340/457; 340/438; 40/592
(58) Field of Classification Search ................. 340/438, 340/457; 40/592
See application file for complete search history.

(56) References Cited

U.S. PATENT DOCUMENTS

| | | | |
|---|---|---|---|
| 3,269,783 A | 8/1966 | Kriz | |
| 4,156,865 A | 5/1979 | Lovell et al. | |
| 4,477,184 A | 10/1984 | Endo | |
| 5,301,446 A | 4/1994 | Kurtz | |
| 5,374,918 A | 12/1994 | Tharbs | |
| 5,389,912 A | 2/1995 | Arvin | |
| 5,424,713 A | 6/1995 | Thompson et al. | |
| 5,479,735 A | 1/1996 | Martin, Jr. | |
| 5,710,553 A | 1/1998 | Soares | |
| 6,034,764 A | 3/2000 | Carter | |
| 6,737,960 B2 | 5/2004 | Preston | |
| 2002/0125279 A1* | 9/2002 | Edgerly et al. | 224/310 |
| 2004/0183661 A1* | 9/2004 | Bowman | 340/435 |
| 2004/0226205 A1 | 11/2004 | Kawakita | |
| 2006/0187012 A1* | 8/2006 | Haskew | 340/440 |
| 2006/0254104 A1* | 11/2006 | Hipple et al. | 40/617 |
| 2007/0103282 A1* | 5/2007 | Caird et al. | 340/435 |

* cited by examiner

*Primary Examiner*—Jeff Hofsass
*Assistant Examiner*—Jack Wang
(74) *Attorney, Agent, or Firm*—Alleman Hall McCoy Russell & Tuttle, LLP

(57) ABSTRACT

Systems for reminding a driver when height extending cargo is loaded on a vehicle. The warning systems can include an indicator that is selectively moveable between a warning position and a prevention position. In the warning position, the indicator is in a driver's field of vision. In the prevention position, the indicator at least partially obstructs cargo from being loaded on the vehicle. The indicator can be moved from the warning position to a prevention position by an arm, which can be designed to extend and retract.

10 Claims, 3 Drawing Sheets

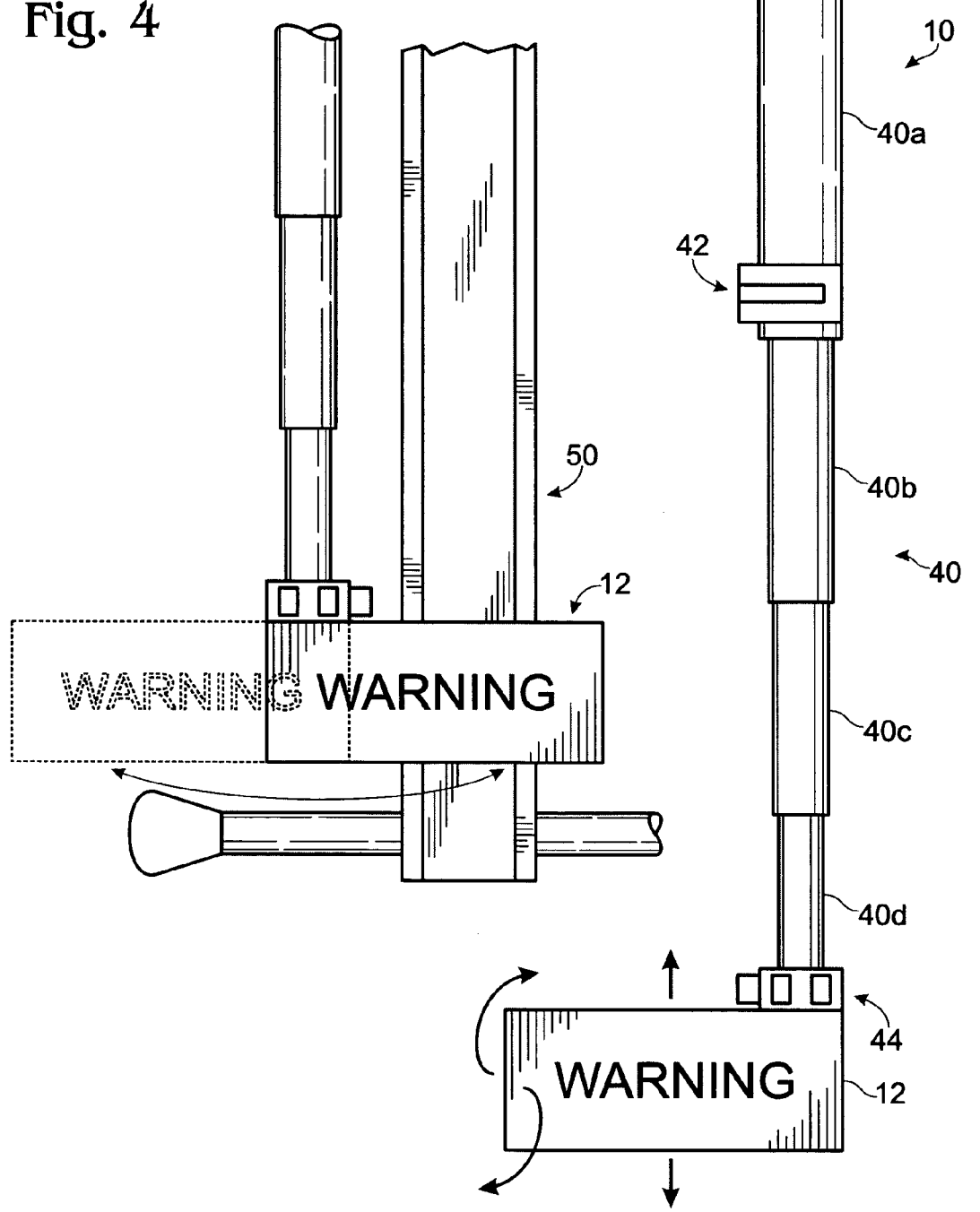

CARGO CLEARANCE WARNING SYSTEM

BACKGROUND AND SUMMARY

Many vehicles are equipped with cargo racks for storing cargo during travel. Cargo racks can be configured to carry bikes, kayaks, skis, snowboards, canoes, luggage, storage containers, gear baskets, and/or a variety of other items.

Cargo that is loaded on a vehicle can increase the effective height of the vehicle. Therefore, a vehicle may not be able to safely pass under a low clearance area when cargo is loaded on the vehicle. Attempting to pass under a low clearance area can cause damage to the cargo, the cargo rack, the vehicle, and/or the low clearance area.

A driver can easily forget about height-extending cargo, thus increasing the risk that the driver will unknowingly attempt to drive under a low clearance area. Others have attempted to address this problem in a variety of different ways. For example, U.S. Pat. No. 6,737,960 to Preston discloses a warning system for detecting when a vehicle is approaching a remote transmitter which is pre-positioned near a low clearance area. The inventor herein has recognized that such an approach does not provide any warning if the vehicle is going to drive under a low clearance area at which a transmitter has not been pre-positioned, thus greatly limiting the effectiveness of the warning system. US Patent Publication No. 2004/0226205A1 to Kawakita discloses another approach, in which a visual indicator is positioned on a blinker/headlight control stick near a vehicle's steering wheel. The inventor herein has recognized that the warning mechanism of Kawakita does not position the warning in the driver's normal field of vision, nor is it configured so a driver is reminded to activate the warning when loading cargo on top of a vehicle.

At least some of these issues can be addressed by the herein disclosed cargo clearance warning systems, which can be configured to warn a driver when cargo is loaded on top of a vehicle and/or the vehicle is approaching a low clearance area. According to some aspects of this disclosure, a warning system can be used to position a reminder in a driver's field of vision so as to decrease the likelihood that overhead cargo is forgotten. Such a system can be designed so that a driver is reminded, if not required, when loading cargo to place a warning indicator in the driving field of vision. According to some aspects of this disclosure, a warning system can be configured to detect when cargo is loaded and/or when the vehicle is approaching a low clearance area. Such a system can be configured to identify low clearance areas that have not been specially marked, tagged, or otherwise identified beforehand.

BRIEF DESCRIPTION OF THE DRAWINGS

Embodiments of the invention are illustrated by way of example and not by way of limitation in the figures of the accompanying drawings, in which like references indicate similar elements and in which:

FIGS. 3 and 4 show the warning system of FIG. 1 in more detail.

WRITTEN DESCRIPTION

Figure 1:
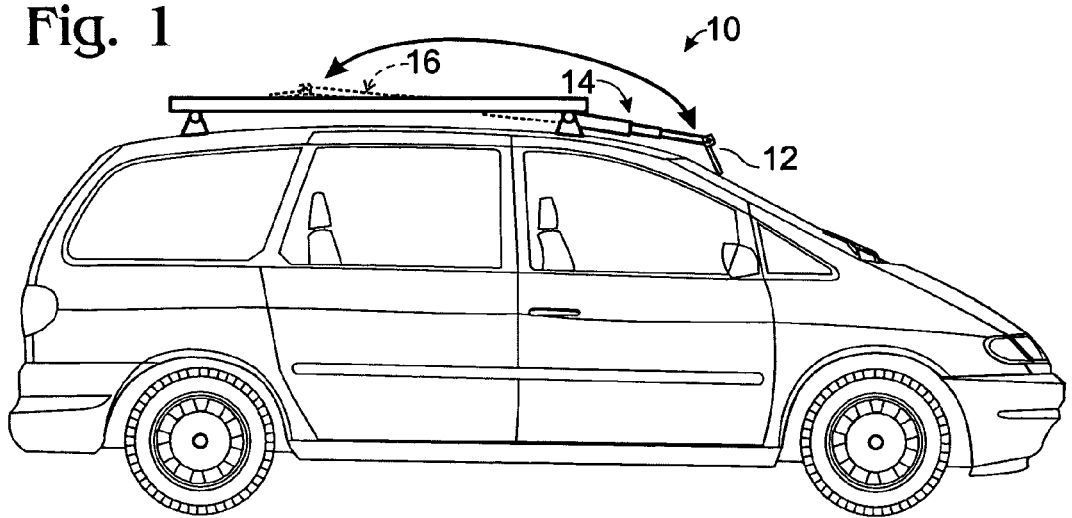
FIG. 1 shows a warning system including an indicator selectively moveable between a warning position and a prevention position in accordance with one aspect of this disclosure.

FIG. 1 shows a nonlimiting example of a warning system 10 that is configured to position a visual indicator 12 in a driver's field of vision when cargo is loaded on top of the vehicle. Warning system 10 can be installed on a cargo rack, although this is not required. In some embodiments, a warning system can be adapted for installation directly on the vehicle or to another structure attached to the vehicle.

Figure 2:
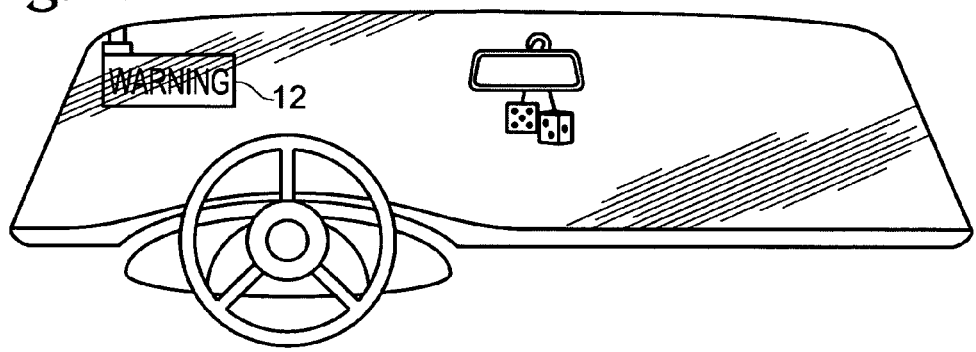
FIG. 2 shows the indicator of FIG. 1 in a warning position from a driver's perspective.

The visual indicator can be moved between a warning position, as indicated at 14, and a prevention position, as indicated in dashed lines at 16. As shown in FIGS. 1 and 2, when in the warning position, indicator 12 can be positioned so that a driver can see the indicator while driving. The indicator may be positioned near the top of a windshield, near the side of a windshield, or at virtually any other desired location depending on the particular configuration of the warning system. As illustrated, the indicator is near the top, driver side of the windshield. The indicator can just as easily be positioned on the passenger side of the vehicle. Two or more warning systems can be used on the same vehicle.

The indicator can be made from an opaque material or the indicator can be made from an at least partially translucent material. The indicator can include lights, reflective material, glowing material, and/or other enhancements to make it more visible, especially in the dark. The indicator can include warning indicia on one or both sides. The warning indicia can include warning messages, icons, symbols, and/or other markings. The size, opacity, and other characteristics of the indicator can be selected so as to provide a suitable reminder to the driver, while at the same time providing the driver with a safe field of vision.

FIG. 3 shows warning system 10 in a warning position 14. The warning system includes mounting assembly 20 for connecting the warning system to a front crossbar 30 of a cargo rack (the warning system can also be connected to a rear crossbar or other mounting location). In the illustrated embodiment, crossbar 30 has a circular cross section and mounting assembly 20 is configured to mount to the circular crossbar. A mounting assembly can also be configured to mount to a rectangular crossbar, oval crossbar, and/or virtually any other crossbar or other portion of a cargo rack or vehicle. In some embodiments, a mounting assembly will primarily be configured to mount on a crossbar having a particular shape, but can be modified to mount on crossbars having other shapes. In some embodiments, a mounting assembly can be designed to cooperate with a plurality of different adapters, each of which are configured to complement a different type of crossbar or other mounting surface, thereby allowing the same mounting assembly to couple to a variety of different racks or other mounting locations.

Mounting assembly 20 is configured to slide around the end of crossbar 30, although this type of mounting is not required. An end cap 32 may be removed in order to slide the mounting assembly around the end of the crossbar. In some embodiments, the mounting assembly can include a hinge that allows the mounting structure to clamp around a crossbar. In some embodiments, a mounting structure may include two or more pieces that are fastened to one another around a crossbar. In some embodiments, clamps, screws, clips, magnets, and/or virtually any other fastening mechanism can be used to mount a warning system to a vehicle.

Mounting assembly 20 includes a tightening mechanism 22 that can be used to tighten and loosen the mounting assembly around crossbar 30. The tightening mechanism can be used to secure the warning system in a warning position or prevention position. Tightening mechanism 22 can constrict around the crossbar as it is turned in one direction and loosen as it is turned in the other direction. In some embodiments, a set screw can be used to hold the warning system in a fixed orientation. In some embodiments, the mounting system can be designed with "stops" that automatically hold the warning system in either a warning position or a prevention position.

Warning system 10 includes a telescoping arm 40 that can be extended or retracted via a plurality of telescoping segments. Arm 40 can extend or retract to display indicator 12 in full view of a driver of a vehicle. When arm 40 is extended to a desired length, arm lock 42 can be engaged to keep the segments of arm 40 from telescoping to an undesired position. Arm lock 42 can function similarly to a lock on an extendible ski pole, or by virtually any other suitable mechanism. The telescoping segments of arm 40 can be made from virtually any material including, but in no way limited to, plastic, graphite, steel, aluminum, or another metal or metal alloy. FIG. 3 shows 4 telescoping segments (i.e., 40a, 40b, 40c, and 40d). A different number of telescoping segments is within the scope of this disclosure. In some embodiments, more telescoping segments may be used, and each of the telescoping segments may be relatively shorter, thus allowing the arm to occupy very little space when fully retracted. In some embodiments, fewer, or even no, telescoping segments may be used.

Indicator 12 can be mounted to arm 40 by an adjustment hinge 44. Adjustment hinge 44 enables indicator 12 to be placed at an angle which allows the indicator to be visible to a driver through a windshield. In some embodiments, adjustment hinge 44 may include a locking mechanism to hold indicator 12 at a desired angle.

FIG. 4 shows warning system 10 in prevention mode 16. Indicator 12 is effectively covering a portion of a bike tray 50 at which a rear bicycle wheel rests when loaded in the bike tray. As shown in FIG. 1, the system can be taken out of prevention mode by pivoting the arm toward the front of the vehicle to a warning position, thus moving the indicator away from the bike tray and placing it in front of the windshield. In this way, the indicator is positioned in a warning position when a bike is loaded on the vehicle. Although a bicycle is used as an example, a warning system of the present disclosure can be configured to be switched from a prevention mode to a warning mode when virtually any item is loaded on a vehicle.

A warning and prevention system can be mounted on the driver-side of a roof rack or the passenger-side of a roof rack based on where an item is to be loaded. A warning phrase may be present on both faces of the indicator, and the indicator may be positioned on either side of the arm so that the warning phrase is visible when mounted to either side of the vehicle. In some embodiments, the indicator may freely pivot about the arm, thus allowing the indicator to be positioned for driver-side or passenger-side attachment. In such embodiments, a pivot lock may be used to hold the indicator in a desired position. In some embodiments, the indicator may be selectively assembled so that it is on the desired side of the arm. In such embodiments, the indicator may be configured so that it can be unassembled and reassembled in a different position, for example if the warning system is moved from one side of a vehicle to the other.

Some warning systems can be designed without a telescoping arm that is used to pivot an indicator between a warning position and a prevention position. As one example, a warning system can include two separate indicator mounts: a prevention mount configured to hold the indicator in a prevention position that prevents cargo from being loaded on the vehicle; and a warning mount that holds the indicator in a warning position (e.g., a position similar to that shown in FIG. 2). In some embodiments, such a warning mount can be located interior the vehicle. The indicator can be held by the prevention mount when cargo is not loaded on the vehicle. In order to load cargo onto the vehicle, the indicator must be moved from the prevention mount. The indicator can be moved to the warning mount, where it can remind a driver that cargo is loaded, thus decreasing the risk of driving the cargo into a low clearance area. In such an arrangement, the indicator can be tethered to the rack, vehicle, or other structure by a leash, although this is not required. Such a leash can be made from a flexible and/or stretchable material, such as rubber or bungee rope.

As another example, the indicator can be positioned on a longitudinal slide that can slide the indicator forward and backward. When in the forward position, the indicator is positioned to remind a driver of loaded cargo. When in the backward position, the indicator is out of the driver's field of vision, and a prevention mechanism moves into a position to prevent cargo loading. In this way, the indicator must be slid to the forward warning position before cargo can be loaded.

Figure 5:
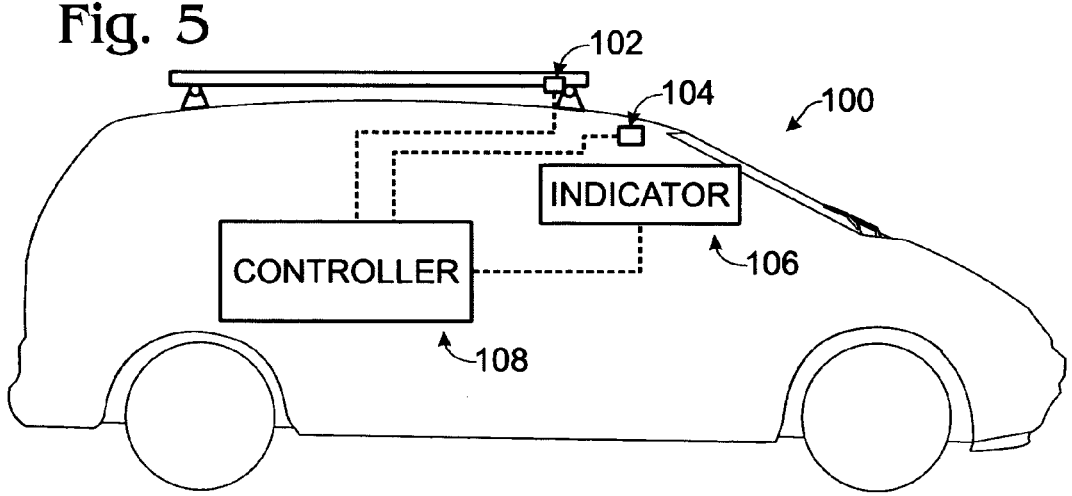
FIG. 5 shows a warning system that includes a detector for detecting low clearance obstacles.

FIG. 5 schematically shows a warning system 100 in accordance with the present disclosure. Warning system 100 includes a cargo detector 102, an obstacle detector 104, an indicator 106, and a controller 108. As described below, warning system 100 can provide an audio, visual, and/or other type of warning when a vehicle approaches a low clearance area and cargo is loaded on top of the vehicle. The warning system can be configured to be virtually (or even completely) unnoticeable if the vehicle is not approaching a low clearance area and/or if there is not any height-extending cargo loaded on the vehicle.

Cargo detector 102 can detect and/or signal when an object is loaded on a vehicle. In some embodiments, the cargo detector can detect the height of the loaded cargo. The cargo detector may be configured to automatically detect when cargo is loaded on a vehicle using weight differential, infrared sensing, optical sensing, electrical sensing, and/or virtually any other suitable mechanism. In some embodiments, a cargo detector can be a switch that is manually toggled when cargo is loaded. In some embodiments, a manual switch may be located near the cargo loading area, and in some embodiments, the switch can be activated when a prevention mechanism is moved from the cargo rack, thus allowing cargo to be loaded onto the rack. The cargo detector can operatively communicate with controller 108 via a wired or wireless connection, thus allowing the controller to know when cargo is loaded on the vehicle.

Obstacle detector 104 can detect oncoming obstacles, including low clearance obstacles. The obstacle detector can be configured to detect an actual obstacle, as opposed to a transmitter or some other type of signaler that is pre-positioned near a low clearance obstacle. The obstacle detector may detect oncoming obstacles using ultrasonic sound, laser radar, electromagnetic radiation, and/or virtually any obstacle detection technology. In some embodiments, an obstacle detector can be configured to detect an approximate distance to the obstacle. In some embodiments, the obstacle detector can be configured to detect if an obstacle is within a predetermined threshold distance. In such embodiments, the predetermined threshold distance may be dynamically changed as vehicle speed changes. The obstacle detector can operatively communicate with controller 108 via a wired or wireless connection, thus allowing the controller to know when the vehicle is approaching a low clearance area.

An obstacle detector may be externally mounted on the roof, roof rack, dashboard, front grill, or any other location that enables obstacle detection. In some embodiments, an obstacle detector may be a constituent component of a vehicle's pre-existing detection system, which can be configured to assist in parking and/or other functions that benefit from detecting nearby obstacles.

Controller 108 can be configured to use information received from the cargo detector and obstacle detector to determine when a vehicle approaches a low clearance area and cargo is loaded on top of the vehicle. Controller 108 can be a component of a vehicle's computer, an auxiliary computer configured to handle a plurality of different functions, or a dedicated device for performing only the warning functions described herein. In some embodiments, controller 108 can be operatively coupled to the vehicle's main computer if controller 108 is not the vehicle's main computer.

The control logic implemented by the controller can vary from application to application without departing from the scope of this disclosure. In the most simple form, the control logic can apply an AND operator to inputs from the cargo detector and obstacle detector to decide if a warning is to be signaled, as shown in the following truth table.

|  | CARGO? - TRUE | CARGO? - FALSE |
|---|---|---|
| OBSTACLE? - TRUE | TRUE - SIGNAL WARNING | FALSE - NO WARNING |
| OBSTACLE? - FALSE | FALSE - NO WARNING | FALSE - NO WARNING |

In some embodiments, the controller can issue different levels of warnings depending on one or more parameters, such as the distance to the obstacle. In some embodiments, a controller can be configured to receive other parameters, such as vehicle speed, and such parameters can be used by the controller to determine an appropriate warning. For example, the controller may signal a more intense warning as, based on obstacle distance and/or vehicle speed, the time until impact decreases. In some embodiments, the control unit may be linked to a vehicle's braking system so that the vehicle will automatically decelerate before impact.

In some embodiments, where the cargo detector is configured to determine the height of the loaded cargo, the controller can determine whether to signal an alarm by determining if the height of the cargo exceeds the available clearance under a detected obstacle. In some embodiments, the controller may require a buffer between the detected height of the low clearance area and the detected height of the cargo so as to provide error tolerance.

Indicator 106 can be configured to provide an audio, visual, and/or other type of reminder if a vehicle is approaching a low clearance area with cargo on board. Nonlimiting examples of reminders include flashing lights, audible alarms, a digitized voice speaking a warning phrase, and/or vibration. As described above, the intensity of the warning can be modulated in accordance with various parameters, including time until impact, which can be estimated based on obstacle distance and vehicle speed. Increased warning intensity can result in warning lights flashing at a higher frequency, warning tones sounding more often and/or at a higher pitch, and/or increased vibration force.

Figure 6:
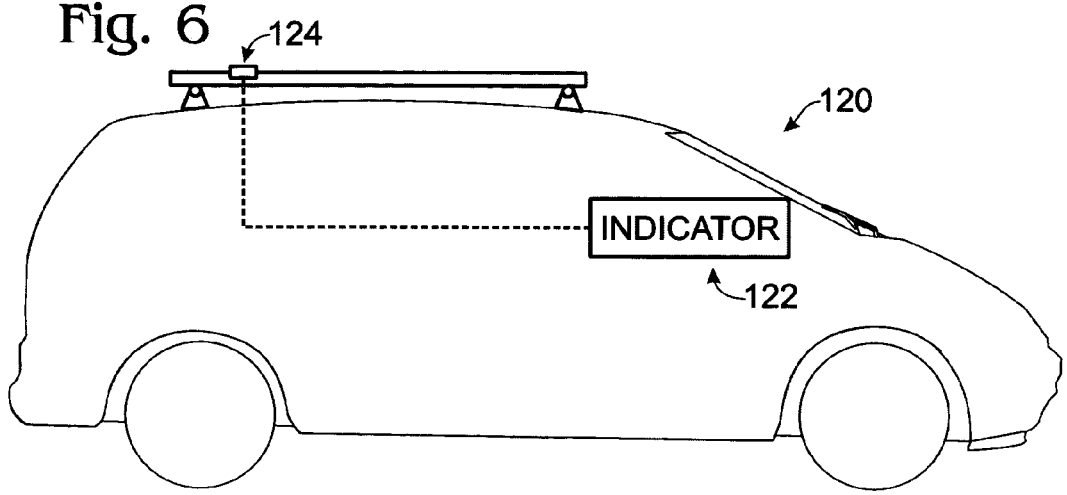
FIG. 6 shows a warning system that includes an indicator that is toggled by a cargo detector or a prevention switch.

A simplified version of the warning system of FIG. 5 can be configured without an obstacle detection mechanism and/or a controller, as shown in FIG. 6 at 120. An indicator 122 may be communicatively coupled to a cargo detector 124 via a wired or wireless connection. In such embodiments, cargo detector 124 can activate indicator 122 when cargo is loaded on the vehicle. In such embodiments, the indicator does not need to receive information from an obstacle detector or any device other than a cargo detector/prevention switch to activate the indicator. By eliminating an obstacle detector, or other devices such as transceivers for receiving signals from pre-positioned remote transmitters, the warning system can be simplified, thus decreasing cost, and potentially improving reliability.

Figure 7:
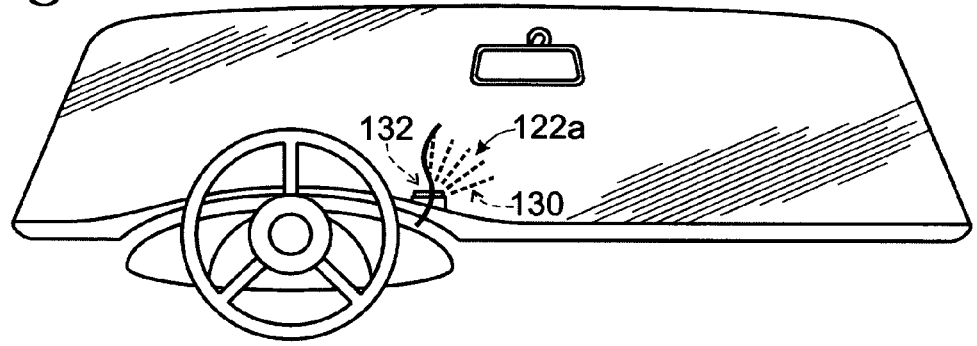
FIG. 7 shows an exemplary indicator for reminding a driver of loaded cargo.

FIG. 7 shows a nonlimiting example of an indicator 122a that can be configured to selectively change appearance or another characteristic when cargo is detected. The indicator can be mounted in a fixed position, including, but not limited to, at the position shown in FIG. 7. In some embodiments, the indicator can be mounted in a position similar to the position of indicator 12 in FIG. 2. The indicator can additionally or alternatively include a portion of the vehicle's dashboard display assembly. In some embodiments, the indicator can be configured to be selectively positioned at a location desired by a driver.

When cargo is loaded, the detection mechanism can toggle the indicator to a "warning" mode of operation in which a warning is displayed (or otherwise activated), as shown at 130. When there is not cargo loaded, the detection mechanism can toggle the indicator to a "no cargo" mode of operation, as shown at 132. As shown in FIG. 7, the indicator can include a warning light that can shine or flash when cargo is loaded, and which can remain inconspicuous when there is not cargo loaded.

Figure 8A:
FIGS. 8A and 8B show another exemplary indicator for reminding a driver of loaded cargo.
Figure 8B:
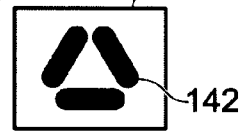

As shown in FIGS. 8A and 8B, the indicator can alternatively or additionally include an at least partially transparent substrate 140. When toggled to the "no cargo" mode (FIG. 8A), the indicator can be inconspicuous, and when toggled to the "warning" mode (FIG. 8B), the indicator can change appearances so as to attract more attention. For example, the indicator can include one or more liquid crystal display modules 142 that present a warning message or otherwise remind a driver of loaded cargo. In the illustrated embodiment, the liquid crystal display modules form a triangular warning icon, but virtually any desired warning indicia and/or message can be used. Furthermore, while a liquid crystal display module is provided as a nonlimiting example of a suitable warning indicator, other devices can additionally or alternatively be used to form the warning message or otherwise remind the driver of loaded cargo. Such indicators can be positioned virtually anywhere, including throughout a driver's field of vision, while remaining within the scope of this disclosure.

Figure 9:
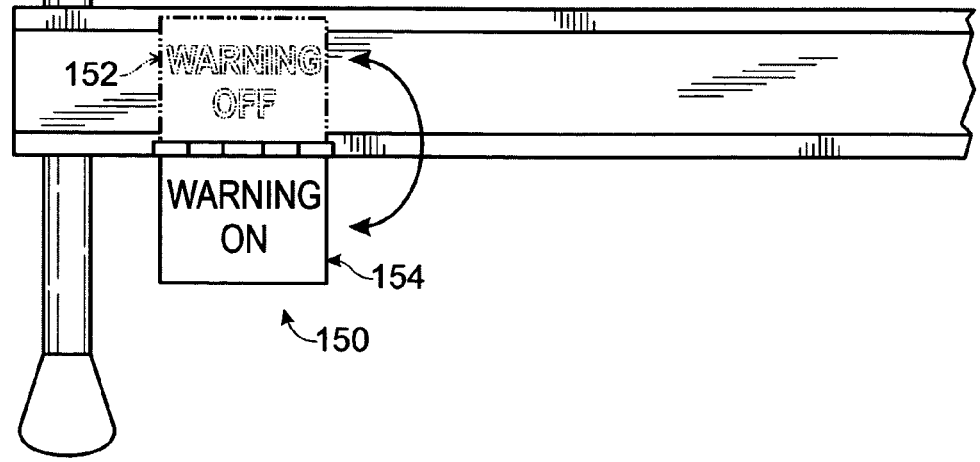
FIG. 9 shows an exemplary prevention switch.

FIG. 9 shows a prevention switch 150 that can be used in place of cargo detector 102, cargo detector 124, or any other warning system in which an indicator can be toggled between a warning mode and a no cargo mode. As shown at 152, the prevention switch is mounted so that it can block cargo from being loaded onto the vehicle. As shown at 154, the switch can be toggled so that cargo can be loaded. When toggled in this manner, the switch can be configured to communicate via a wired or wireless connection with an indicator, which can remind a driver that cargo is loaded on the vehicle. As nonlimiting examples, upon being toggled, switch 150 can be configured to open or close a circuit; change resistance, capacitance, or some other measurable electromagnetic effect; activate an optical sensor; or otherwise change states in a manner that can be detected and utilized by an indicator and/or a controller so that a driver can be reminded of loaded cargo.

While prevention switch 150 is illustrated as pivoting on a simple hinge, it should be understood that other switching arrangements are within the scope of this disclosure. For example, a switch can work on a slide, or be configured to be moved between two separate mounting positions. Furthermore, while prevention switch 150 is configured to work with a bicycle tray, it should be understood that prevention switches can be configured to work with a carrier for virtually any type of cargo.

In some embodiments, the components of a warning system may be provided as a single aftermarket package that can be installed on a vehicle. In some embodiments, one or more components of the warning system can be stock components, which can have one or more other functions. For example, indicator 106 can include an add-on speaker and/or light that is affixed to a suitable location on a vehicle (e.g., dashboard or windshield); or indicator 106 can be the vehicle's stereo system and/or information display panel. As another example, obstacle detector 102 can include an add/on instrument that is affixed to the vehicle; or the obstacle detector can include the vehicle's standard obstacle detection system.

Various aspects of this disclosure are described using terms commonly employed by those skilled in the art to convey the substance of their work to others skilled in the art. However, it should be apparent to those skilled in the art that alternate embodiments may be practiced with only some of the described aspects. For purposes of explanation, specific materials and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

The phrase "in some embodiments" may be used repeatedly. The phrase does not necessarily refer to the same embodiment; however, it may. The terms "comprising," "having," and "including" are synonymous, unless the context dictates otherwise.

The invention claimed is:

1. A cargo warning system, comprising: a cargo tracker exterior a vehicle passenger compartment and selectively changeable between a first configuration when cargo is loaded on a vehicle and a second configuration when no cargo is loaded on the vehicle, wherein the cargo tracker is configured to prevent cargo from being loaded on the vehicle in the second configuration; and
   an indicator operatively communicating with the cargo tracker and configured to automatically change states to remind a driver of loaded cargo responsive to the cargo tracker being changed to the first configuration.

2. The cargo warning system of claim 1, wherein the indicator is configured to be inconspicuous to the driver when the cargo tracker is in the second configuration.

3. The cargo warning system of claim 1, wherein a common warning structure serves as the indicator and the cargo tracker.

4. The cargo warning system of claim 3, wherein the common warning structure is connected to a telescoping arm that pivots the common warning structure between a position to be viewed through a windshield and a position at least partially obstructing cargo from being loaded on the vehicle.

5. The vehicle warning system of claim 1, wherein the cargo tracker includes a cargo detector configured to detect when cargo is loaded on the vehicle.

6. The vehicle warning system of claim 1, wherein the cargo tracker includes a prevention switch configured to signal when cargo is loaded on the vehicle.

7. The vehicle warning system of claim 1, wherein the indicator is configured to remind a driver of loaded cargo by at least one of visual warnings, audio warnings, and vibrations.

8. The vehicle warning system of claim 1, wherein the cargo tracker is communicatively coupled to the indicator via a wired connection.

9. The vehicle warning system of claim 1, wherein the cargo tracker is communicatively coupled to the indicator via a wireless connection.

10. A cargo warning system, comprising:
    a cargo tracker exterior a vehicle passenger compartment and selectively changeable between a first configuration when cargo is loaded on a vehicle and a second configuration when no cargo is loaded on the vehicle, the cargo tracker including an indicator positionable to remind a driver of loaded cargo when the cargo tracker is in the first configuration and positionable to prevent cargo from being loaded on the vehicle in the second configuration.

* * * * *